Oct. 16, 1928.
W. TEHEL
HANDLE FOR CANS
Filed Dec. 1, 1927
1,688,165
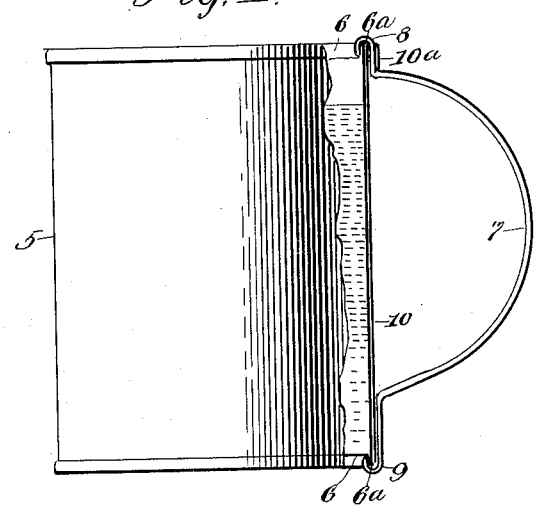
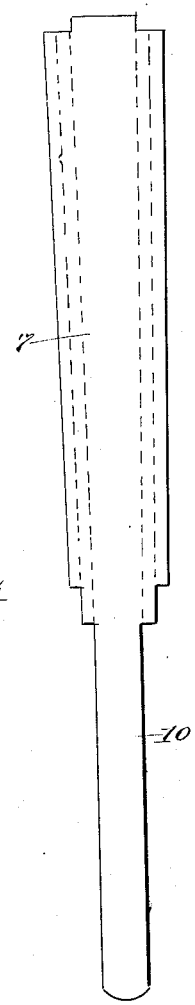
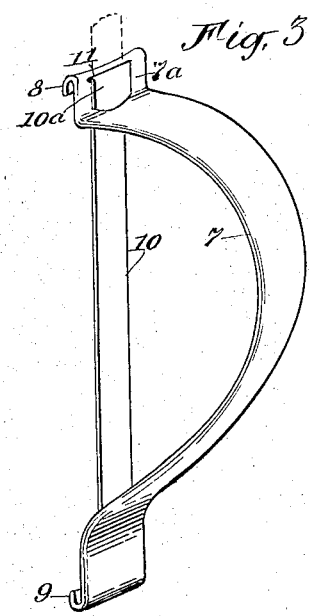
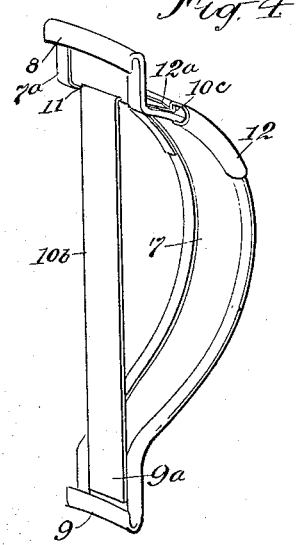
Inventor
William Tehel
By J. M. St. John
Attorney Patented Oct. 16, 1928.

1,688,165

UNITED STATES PATENT OFFICE.

WILLIAM TEHEL, OF CEDAR RAPIDS, IOWA.

HANDLE FOR CANS.

Application filed December 1, 1927. Serial No. 237,109.

This invention relates to handles for utensils, and the object of the invention is to provide a handle which may be readily attached to a can, or the like, for convenience in handling and using the same.

The invention is fully disclosed in the description and claims following, reference being had to the accompanying drawing, in which:—

Fig. 1 is a central, vertical section lengthwise of a handle embodying the invention, as in use, the connected portion of the can to which it is attached being also in section. Fig. 2 shows the sheet metal blank from which the handle of Figs. 1 and 3 is formed. Fig. 3 is a view in perspective of the handle shown in section in Fig. 1. Fig. 4 is a view in perspective of a handle of somewhat modified type.

In the drawing, the numeral 5 denotes an ordinary tin can, which is commonly provided with an inset head 6 at each end. This gives the can a short bead 6ª to which a handle may be hooked, as will be described presently. In the case of a can containing a beverage of any sort, it is often desired to cut out one head, and then attach a handle to the can so that it may be easily and conveniently used as a drinking cup.

A handle of the preferred type is shown in Figs. 1 and 3, the blank from which it is formed being shown in Fig. 2. The wider part of the blank being folded over at the sides to form beaded edges (preferably three-ply, by double folds) the blank is bent to form a curved handle 7 with terminal hooks 8 and 9. The tongue 10 is bent into the hook 9, and in the finished handle passes through a slot 11 at the other end of the handle. The handle being hooked on the beads of the can and pressed tightly in position, the end of the tongue 10ª is bent down from the slot along the shoulder 7ª, and thus locks the handle securely in place.

The same sized handle may be attached to a shorter can by springing the handle more or less, and locking it by turning down a longer tang from the tongue. The doubly folded edges give considerable elasticity to the handle, and much increase its strength, beside giving it a neat finish. This is extended into the hooks themselves, thus making them strong and serviceable.

In the modified handle of Fig. 4 the tongue 10ᵇ is shown as a separate piece soldered to the main body at 9ª. The slot 11 is here shown at the base of the shoulder 7ª, and obviously cannot be bent into a close hook as in Fig. 3. The tongue is accordingly provided with an upturned lip 10ᶜ to engage a hook 12ª formed at the end of a slide 12 movable on the handle body 7. This serves to hold the down-folded tang securely in position, so that there can be no possible slippage tending to detach the hooks.

The handle serves as a convenient means for carrying a number of vans in a single group, by the hand alone, or tied together in a bundle. It is to be noted also that the same device, made stronger and heavier, may serve as a carrier for casks, or other receptacles provided with terminal chines or ribs.

Having thus described my invention, I claim:

1. A can handle having a curved body terminating in hooks to engage the end-flanges of the can, and slotted adjacent to one hook, and a tongue extending through said slot from the opposite end of the handle, by the folding of which tongue the handle is secured on the can.

2. A can handle having an arched body, slotted near one end to admit a tongue, a tongue attached to the opposite end and provided with a terminal lip, and a slide movable on the handle body, and adapted to engage the free end of the tongue when bent down to hold the hooks in engagement with the can.

In testimony whereof I affix my signature.

WILLIAM TEHEL.